United States Patent [19]

Ohkubo

[11] Patent Number: 5,557,599

[45] Date of Patent: Sep. 17, 1996

[54] METHOD FOR INITIALIZING A PHASE-CHANGE TYPE OF OPTICAL DISK UTILIZING EITHER ABSORPTION RATES OR MARK LENGTHS

[75] Inventor: Shuichi Ohkubo, Tokyo, Japan

[73] Assignee: NEC Corporation, Japan

[21] Appl. No.: 421,490

[22] Filed: Apr. 13, 1995

[30] Foreign Application Priority Data

Apr. 15, 1994 [JP] Japan ................................ 6-076786
Dec. 19, 1994 [JP] Japan ................................ 6-315243

[51] Int. Cl.$^6$ ............................. G11B 7/00; G11B 7/24
[52] U.S. Cl. ......................................... 369/116; 369/275.2
[58] Field of Search .................................. 369/116, 295.2

[56] References Cited

U.S. PATENT DOCUMENTS

| | | | |
|---|---|---|---|
| 5,305,297 | 4/1994 | Nishiuchi et al. | 369/116 |
| 5,418,770 | 5/1995 | Ide et al. | 369/116 |
| 5,485,449 | 1/1996 | Nakajo | 369/116 |

FOREIGN PATENT DOCUMENTS

| | | |
|---|---|---|
| 3216816 | 9/1991 | Japan . |
| 3-278338 | 12/1991 | Japan . |
| 4-209317 | 7/1992 | Japan . |
| 4366424 | 12/1992 | Japan . |
| 5062259 | 3/1993 | Japan . |

Primary Examiner—Frank Gonzalez
Assistant Examiner—Jason D. Eisenberg
Attorney, Agent, or Firm—Hayes, Soloway, Hennessey, Grossman & Hage, P.C.

[57] ABSTRACT

In a method for initializing a phase-change type of optical disk, light is irradiated onto a recording layer for initializing the optical disk. The light has a strength such that the relation between absorbing rates "Ai" of an initialized crystal region and "Ae" of an erased crystal region satisfies the following formula:

$$|Ai-Ae|/Ae<0.05$$

9 Claims, 10 Drawing Sheets

INITIALIZED

RECORDED

RECORDED → DC ERASED

INITIALIZED (ABSORBING RATE Ai)

ERASED (ABSORBING RATE Ae)

FIG. 7

| | 4mW | 5mW | 6mW | 8mW |
|---|---|---|---|---|
| \|Ai − Ae\| / Ae | 0.14 | 0.04 | 0 | 0.07 |
| ERROR RATE (First Recording) | $4 \times 10^{-6}$ | $3 \times 10^{-6}$ | $2 \times 10^{-6}$ | $1 \times 10^{-6}$ |
| ERROR RATE (100 Times Recording) | $1 \times 10^{-4}$ | $1 \times 10^{-5}$ | $5 \times 10^{-6}$ | $3 \times 10^{-5}$ |
| Li (μm) | 1.5 | 1.5 | 1.5 | 1.5 |
| Le (μm) | 1.35 | 1.45 | 1.5 | 1.58 |
| \|Li − Le\| | 0.15 | 0.05 | 0 | 0.08 |

FIG. 9

| | 530mW | 550mW | 580mW | 600mW |
|---|---|---|---|---|
| $|Ai - Ae|/Ae$ | 0.10 | 0.03 | 0 | 0.06 |
| ERROR RATE (First Recording) | $3 \times 10^{-6}$ | $2 \times 10^{-6}$ | $1 \times 10^{-6}$ | $1.5 \times 10^{-6}$ |
| ERROR RATE (100 Times Recording) | $3 \times 10^{-5}$ | $8 \times 10^{-6}$ | $4 \times 10^{-6}$ | $2 \times 10^{-5}$ |
| Li (μm) | 1.5 | 1.5 | 1.5 | 1.5 |
| Le (μm) | 1.37 | 1.46 | 1.5 | 1.56 |
| $|Li - Le|$ | 0.13 | 0.04 | 0 | 0.06 |

NUMBER OF RECORDING

○ IRRADIATION ENERGY 2.2KJ
□ IRRADIATION ENERGY 2.4KJ
△ IRRADIATION ENERGY 2.6KJ

FIG. 12

|  | | | |
|---|---|---|---|
| $|Ai - Ae|/Ae$ | 0.08 | 0 | 0.1 |
| ERROR RATE (First Recording) | $3 \times 10^{-6}$ | $2 \times 10^{-6}$ | $1 \times 10^{-6}$ |
| ERROR RATE (100 Times Recording) | $2.5 \times 10^{-5}$ | $8 \times 10^{-6}$ | $3 \times 10^{-5}$ |
| Li (μm) | 1.5 | 1.5 | 1.5 |
| Le (μm) | 1.39 | 1.5 | 1.59 |
| $|Li - Le|$ | 0.11 | 0 | 0.09 |

Top row: 1.9KJ, 2.2KJ, 2.5KJ

//5,557,599

METHOD FOR INITIALIZING A PHASE-CHANGE TYPE OF OPTICAL DISK UTILIZING EITHER ABSORPTION RATES OR MARK LENGTHS

FIELD OF THE INVENTION

The invention relates to a method for initializing a phase-change type of optical disk, especially to an improved method for initializing an optical disk on which mark edge recording is carried out.

BACKGROUND OF THE INVENTION

These days, there are several types of optical disks in which information is recorded, erased and reproduced by a laser beam, which include the optical magnet and phase-change types of optical disk. In a phase-change type of optical disk, light is irradiated onto the surface of the disk to change the phase condition to record information, erase the recorded information and reproduce the recorded information.

Usually a phase-change type of optical disk includes a substrate, a lower protection layer provided on the substrate, a recording layer provided on the lower protection layer, an upper protection layer provided on the recording layer and a reflection layer provided on the upper protection layer. When the recording layer is heated so as to be melted and suddenly cooled down so as to become non-crystal condition, information is recorded thereon. On the other hand, when the recording layer is maintained at a predetermined temperature so as to have a crystalline condition, the recorded information is erased. The recorded information can be reproduced by using the difference in reflection rate between crystal region (non-recorded) and non-crystal region (recorded).

For high density recording, a mark-edge recording by which information is recorded on the both ends of a recording mark is useful. In a phase-change type of optical disk, crystal and non-crystal regions are different in absorbing rate from each other. When overwriting information, the length of a record mark changes depending on the condition of the recording layer, i.e., whether crystal or non-crystal. To prevent this kind of problem, an optical disk having a reflection layer which is of Si or Au having a thickness of less than 20 nm has been proposed to increase the absorbing rate of the crystal region above that of the non-crystal region. DC erasing can be used for the same purpose, however, overwriting cannot be carried out.

The phase-change type of optical disk which has been just fabricated has a recording layer of non-crystalline condition, so that the disk is required to be initialized before use. For initializing such a disk, the recording layer is crystallized by irradiating laser beam or flash lamp thereto. There have been proposed some conventional methods for initializing a phase-change type of optical disk, that are described in Japanese Publication Kokai H3-278338 and H4-209317 to increase erasing rate and C/N or to shorten initializing time. In publication H3-278338, a laser beam having a larger diameter is used to maintain time for crystallization. In publication H4-209317, the recording layer has inconsistent composition. According to the conventional technology in a phase-change type of optical disk, recording characteristics change between the beginning, which is just after initialization, and after some re-writing. Especially, in mark edge recording, recording error is increased.

SUMMARY OF THE INVENTION

Accordingly, an object of the invention is to provide an improved method for initializing a phase-change type of optical disk by which the recording characteristics of the disk do not change despite being used many times.

According to an aspect of the invention, in a method for initializing an optical disk, light is irradiated onto a recording layer for initializing the optical disk, the light having a strength so that the relation between absorbing rates "Ai" of an initialized crystal region and "Ae" of an erased crystal region meets the following formula:

$$|Ai-Ae|/Ae<0.05$$

Preferably, "Ai"="Ae".

According to another aspect of the invention, in a method for initializing an optical disk, light is irradiated onto a recording layer for initializing the optical disk, the light having a strength so that the relation between the length of first recorded mark region "Li" and the length "Le" of a mark after second time recording meets the following formula:

$$|Li-Le|<0.05 \text{ μm}$$

Preferably, "Li"="Le".

BRIEF DESCRIPTION OF THE DRAWINGS

FIG. 7 is a table showing test result of the first preferred embodiment.

FIG. 9 is a table showing test results of the second preferred embodiment.

FIG. 12 is a table showing test results of the third preferred embodiment.

DESCRIPTION OF THE PREFERRED EMBODIMENTS

Figure 1:
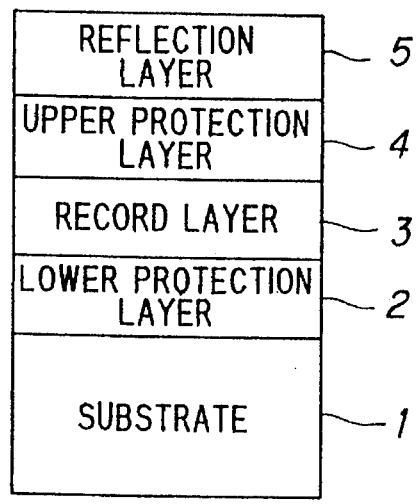
FIG. 1 is a conceptual view showing a phase-change type of optical disk.
Figure 2:
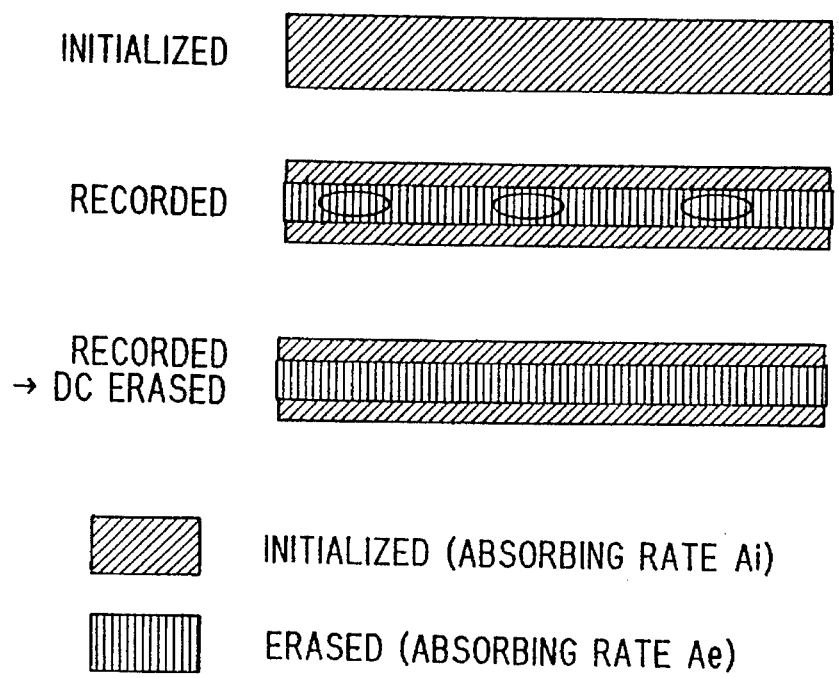
FIG. 2 is a cross-sectional view showing recording layers in different conditions.

FIG. 1 shows a general structure (cross-sectional view) of a phase-change type of optical disk, which includes a substrate 1, a lower protection layer 2 provided on the substrate 1, a record layer 3 provided on the lower protection layer 2, an upper protection layer 4 provided on the record layer 3 and a reflection layer provided on the upper protection layer 4. FIG. 2 shows the inside of the record layer in different conditions of just initialized, recorded and erased.

Figure 3:
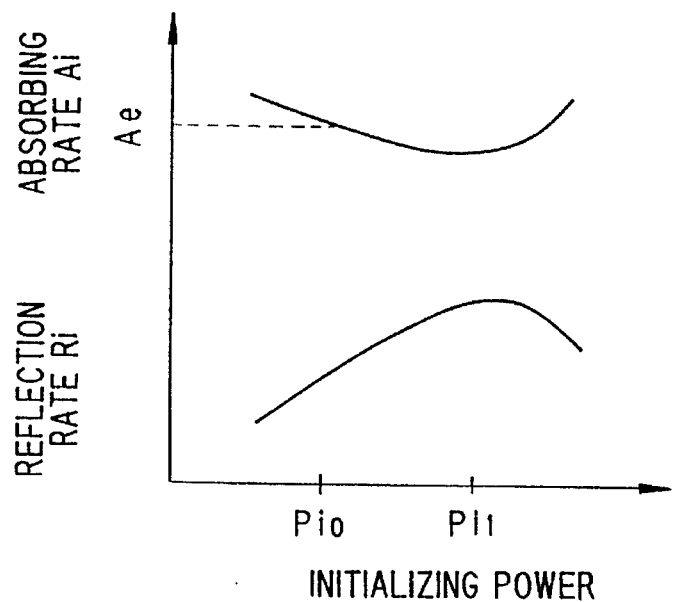
FIG. 3 is a graph showing the relation between initializing power and reflection rates.

Generally in a mark-edge recording, in which information to be recorded can be changed by adjusting the length thereof, the lengths of information marks should be controlled precisely. As shown in FIG. 3, the reflection rate and absorbing rate change depending on initializing power. The recording sensitivity of the first record varies depending on absorbing rate "Ai" of initialized record layer which is crystal, and the recording sensitivity of the record layer after more than twice recording varies depending on the absorbing rate "Ae" of erased crystal region. The absorbing rate "Ae" is a uniform value for the structure of the disk, however the absorbing rate changes by use of the disk, which means "Ai" and "Ae" are not always equal. For example, when an optical disk is initialized by using a laser beam having a diameter of 1.5 μm, the optical characteristics of the disk change depending on the power of the laser beam, as shown in FIG. 3. If the optical disk is initialized by a laser beam having a power of "Pi1" which makes the relation of "Ai"<"Ae", the difference in reflection between crystal and non-crystal regions is large, so that C/N is high. However, an erased region which has been recorded and erased some times has a higher sensitivity relative to that of an initialized region; and therefore, record marks get longer as time increases. In contrast, if the optical disk is initialized by a laser beam having a power of "Pi0" which makes the relation of "Ai"="Ae", no difference in reflection between crystal and non-crystal regions occurs, and therefore, record marks do not change in length as time goes on.

The appropriate power "Pi0" of initializing light, which satisfies the relation of Ai=Ae, is as follows, because the change of lengths of marks affects second harmonics distortion (2nd H/C): First, several lights having different powers are irradiated onto a record region to be crystallized to make several different initialized regions on the disk, then each region is recorded and erased several times by the same power of light. If a region has a uniform second harmonics distortion, the region can be considered as having been initialized by light having the appropriate initializing power Pi0 which satisfies the relation of Ai=Ae. If the disk is initialized by using light having power Pi0, stable recording characteristics can be realized over a long time.

Next, preferred embodiments of the invention are described.

[First Embodiment]

Referring to FIG. 1 again, the substrate 1 is made of polycarbonate (PC), the lower protection layer 2 is made of ZnS-SiO$_2$ having a thickness of 250 nm, and the record layer 3 is made of Ge$_2$Sb$_2$Te$_5$ having a thickness of 25 nm, the upper protection layer 4 is made of ZnS-SiO$_2$ having a thickness of 20 nm, and the reflection layer 5 is made of aluminum having a thickness of 60 nm. These layers are fabricated by sputtering techniques.

Figure 4:
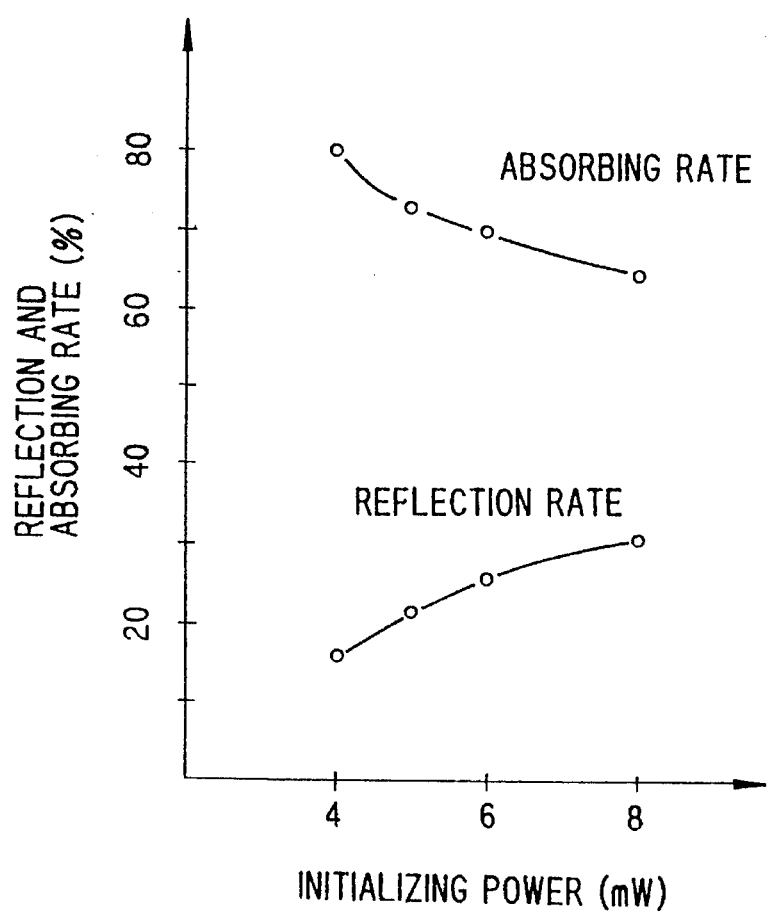
FIG. 4 is a graph showing the relation between initializing power and reflection and absorbing rates.
Figure 5:
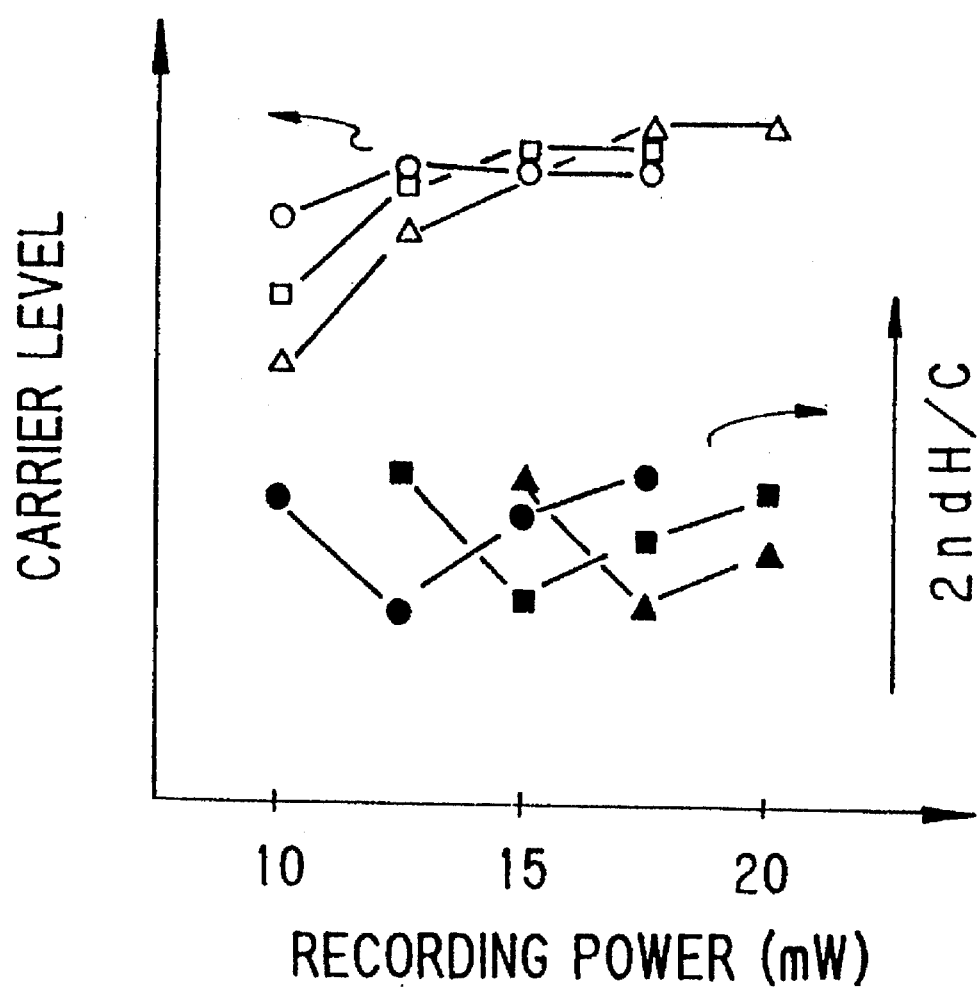
FIG. 5 is a graph showing the relation between recording power and carrier level in a first preferred embodiment according to the invention.

The fabricated optical disk is initialized by lights having different powers, then the disk is tested in length of marks and error rate resulting from alternating record and erase. Initialization is performed by using a semiconductor laser having a wavelength of 830 nm, a beam diameter of 1.5 μm and an irradiation speed of 7.5 m/s. The power of the laser beam is changed between 4, 5, 6 and 8 mW. Depending on the different initializing powers, the reflection rate and absorbing rate of the optical disk change as shown in FIGS. 4 and 5.

Figure 6:
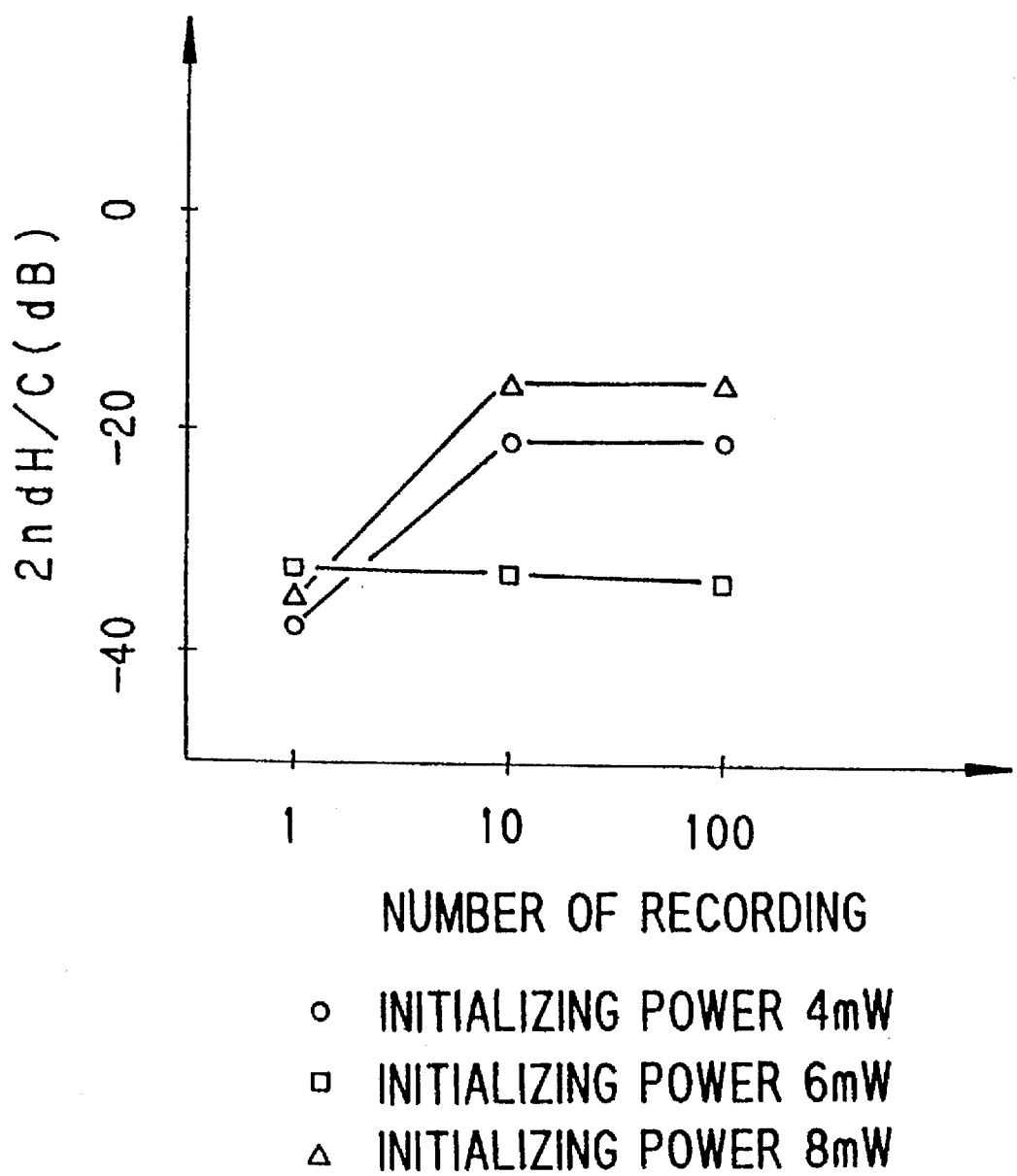
FIG. 6 is a graph showing the relation between the number of recording and 2nd H/C (dB) in the first preferred embodiment.

For each region initialized by a respective different power, the appropriate recording power, by which the second harmonics distortion (2nd H/C) of a recording signal is minimized in the first record processing, is given, as shown in FIG. 6. Each region is alternatively recorded and erased 100 times by the same power of light at 11.3 m/s. The difference of length of marks between "Li" for first recording and "Le" after plural recordings and error rate of each region are detected, as shown in FIG. 7. As shown in FIG. 7, with each of the initializing powers 5 mW and 6 mW, which satisfy the condition "|Ai−Ae|/Ae<0.05", the disk satisfies the condition "|Li−Le|<0.05 μm" and error rate of less than $10^{-5}$.

[Second Embodiment]

Referring to FIG. 1 again, the substrate 1 is made of polycarbonate (PC), the lower protection layer 2 is made of ZnS-SiO$_2$ having a thickness of 100 nm, and the record layer 3 is made of Ge$_2$Sb$_2$Te$_5$ having a thickness of 15 nm, the upper protection layer 4 is made of ZnS-SiO$_2$ having a thickness of 20 nm, and the reflection layer 5 is made of aluminum having a thickness of 60 nm. These layers are fabricated by sputtering techniques.

Figure 8:
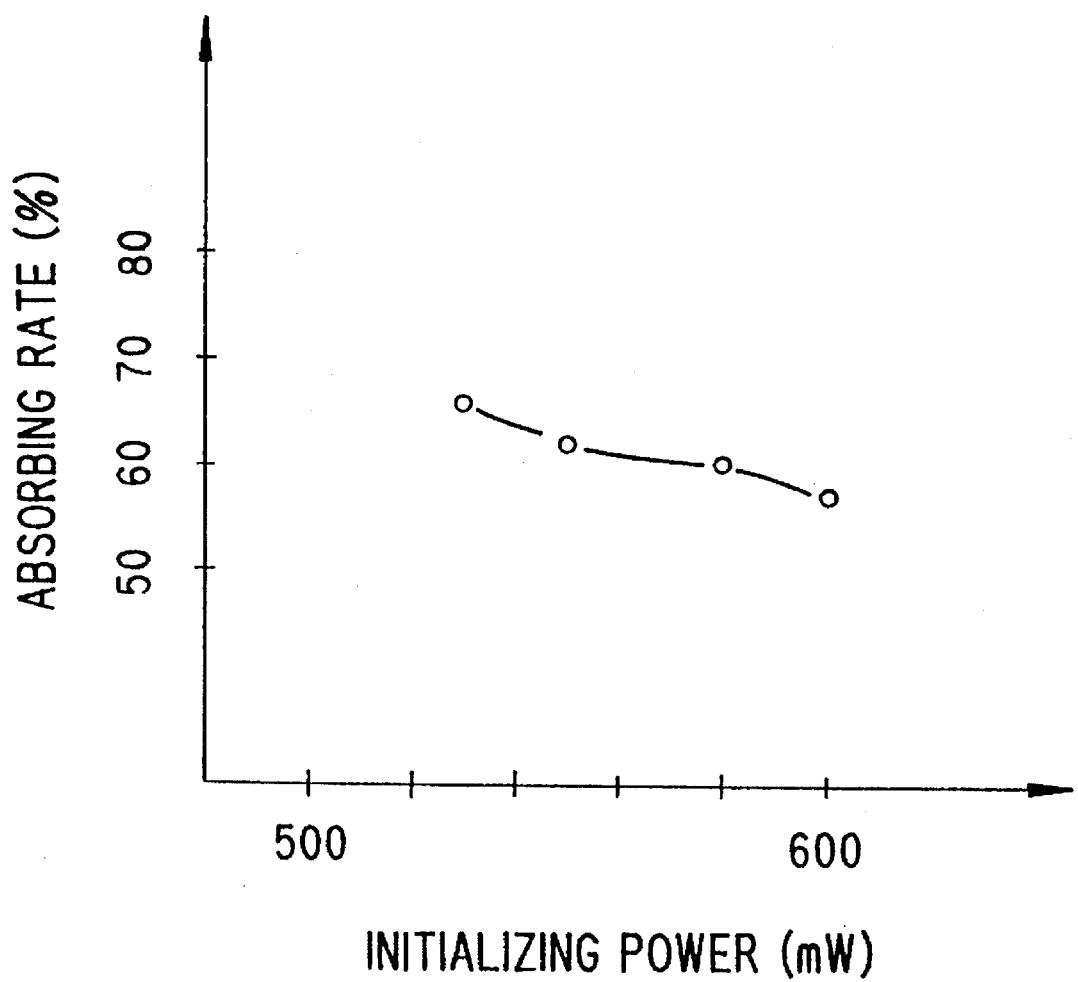
FIG. 8 is a graph showing the relation between initializing power of a laser beam and absorbing rate in a second preferred embodiment according to the invention.

The fabricated optical disk is initialized by using a semiconductor laser having a wavelength of 830 nm, a beam diameter of 100 μm and an irradiation speed of 2 m/s. The power of the laser beam is changed between 530, 550, 580 and 600 mW. After initialization, recording characteristics are detected using a laser beam having an irradiation speed of 11.3 m/s. Depending on the different initializing powers, the absorbing rate of the optical disk change as shown in FIG. 8.

For each region initialized by a respective different power, the appropriate recording power, by which the second harmonics distortion (2nd H/C) of a recording signal is minimized in the first record processing, is given. Each region is alternatively recorded and erased 100 times by the same power of light at 11.3 m/s. The difference of length of marks between "Li" for first recording and "La" after plural recordings and error rate of each region are detected, as shown in FIG. 9. As shown in FIG. 9, with each of the initializing powers 550 mW and 580 mW, which satisfy the condition "|Ai−Ae|/Ae<0.05", the disk satisfies the condition "|Li−Le|<0.05 μm" and error rate of less than $10^{31\ 5}$.

[Third Embodiment]

Referring to FIG. 1 again, the substrate 1 is made of polycarbonate (PC), the lower protection layer 2 is made of ZnS-SiO$_2$ having a thickness of 100 nm, and the record layer 3 is made of Ge$_2$Sb$_2$Te$_5$ having a thickness of 15 nm, the upper protection layer 4 is made of ZnS-SiO$_2$ having a thickness of 40 nm, and the reflection layer 5 is made of aluminum having a thickness of 60 nm. These layers are fabricated by sputtering techniques.

Figure 10:
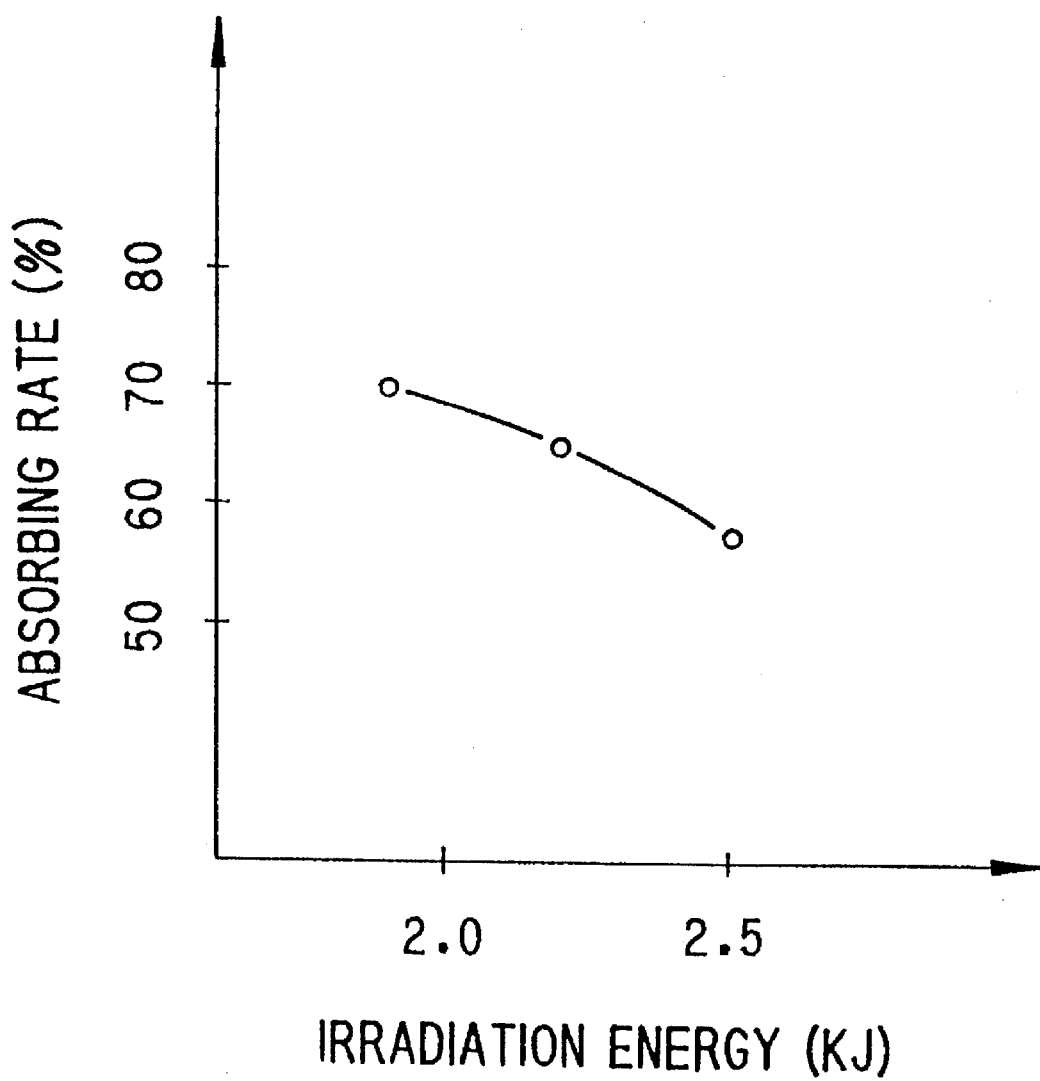
FIG. 10 is a graph showing the relation between initializing energy of a flash lamp and absorbing rate in a third preferred embodiment according to the invention.

The fabricated optical disk is initialized by using a flash lamp whose strength may be changed. After initialization, recording characteristics are detected. Depending on the different energies of the flash lamp, the absorbing rate of the optical disk changes as shown in FIG. 10.

Figure 11:
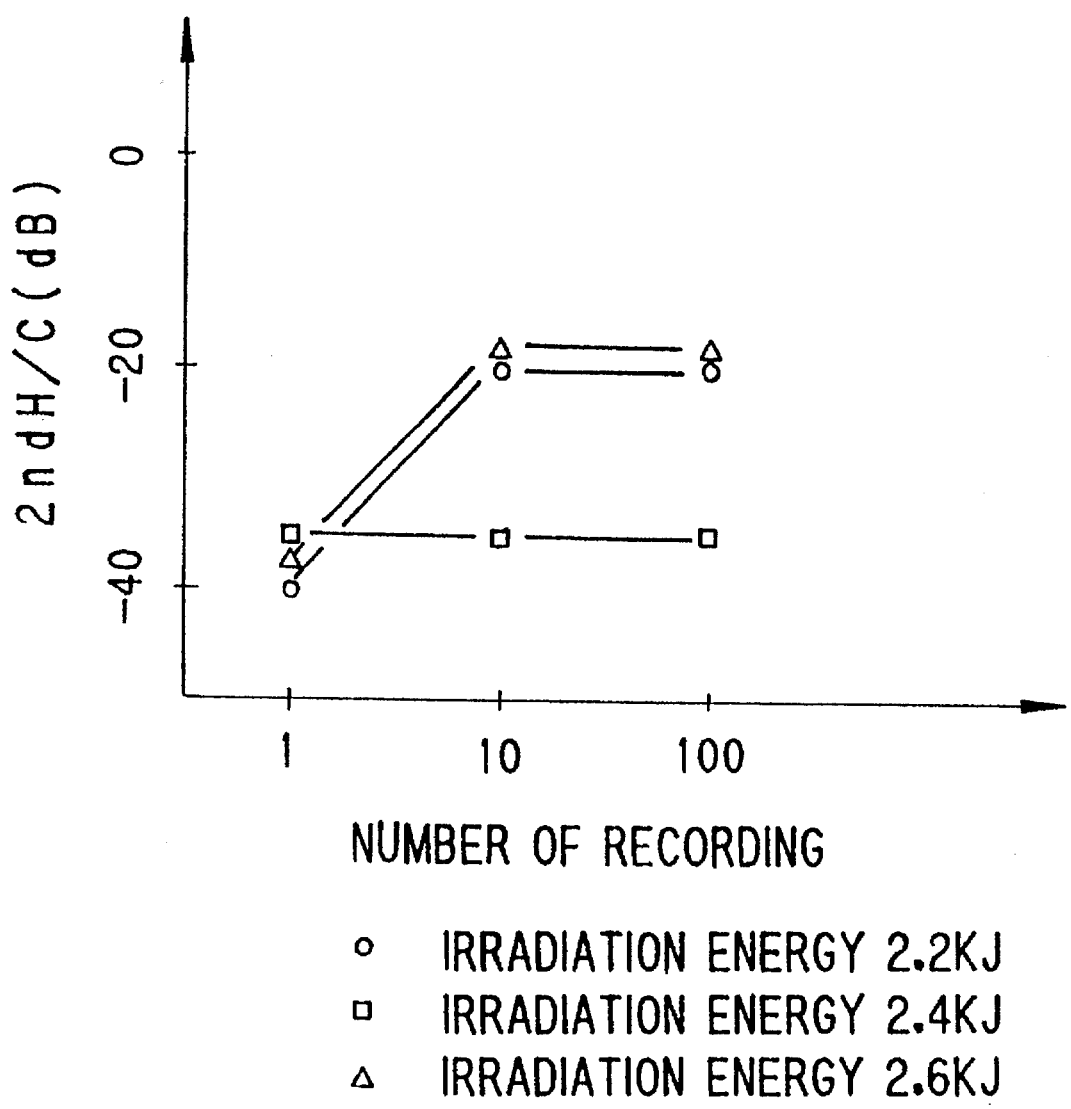
FIG. 11 is a graph showing the relation between the number of recording and 2nd H/C (dB) in the third preferred embodiment.

For each region initialized by a respective different energy of light, the appropriate recording power, by which the second harmonics distortion (2nd H/C) of a recording signal is minimized in the first record processing, is given, as shown in FIG. 11. Each region is alternatively recorded and erased 100 times by the same power of light at 11.3 m/s. The difference of length of marks between "Li" for first recording and "Le" after plural recordings and error rate of each region are detected, as shown in FIG. 12. The test is carried out under the same conditions as the first embodiment, in which the mark length of 3.39 MHz signal is detected. As shown in FIG. 12, with the initializing power 2.2 KJ, which satisfies the condition "|Ai−Ae|/Ae=0", the disk has an error rate of less than $10^{-5}$.

As described above, the phase-change type of optical disk according to the first to third preferred embodiments has a small variation of mark length in a mark-edge recording, so that stable recording can be realized.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A method for initializing an optical disk on which information is recorded, erased and reproduced by changing phase conditions of portions of said disk between crystal and non-crystal phase conditions, comprising the steps of:

providing a recording layer;

crystallizing a plurality of record regions of said recording layer with a corresponding plurality of light beams, each of said plurality of light beams having a different strength and irradiating only a respective one of said record regions;

repeatedly recording and erasing data in said record regions using another plurality of light beams irradiating only respective record regions, each of the light beams of said other plurality having a strength that is equal to the strength of the light beam used to crystallize the respective record region being irradiated by the light beam of the other plurality;

measuring second harmonics distortions of said record regions and determining based thereon one record region having uniform second harmonics distortions; and irradiating initializing light onto the recording layer for initializing the optical disk, the initializing light having a strength that is equal to the strength of the light beams used to irradiate the one record region having uniform second harmonics distortion, whereby to ensure that absorbing rates "Ai" of a given initialized crystal region and "Ae" of a given erased crystal region of said optical disk satisfy the following formula:

$$|Ai-Ae|/Ae<0.05.$$

2. The method according to claim 1, wherein:
said "Ai" and "Ae" are equal to each other.
3. The method according to claim 1, wherein:
said information is recorded by a mark-edge recording technique.
4. The method according to claim 1, wherein:
said light for initializing is generated by a semiconductor laser.
5. The method according to claim 1, wherein:
said light for initializing is generated by a flash lamp.
6. A method for initializing an optical disk in which information is recorded, erased and reproduced by changing phase conditions of portions of said disk between crystal and non-crystal phase conditions, comprising the steps of:

providing a recording layer on which said information may be recorded;

providing a reflection layer on the recording layer;

crystallizing a plurality of record regions of said recording layer with a corresponding plurality of light beams, each of said plurality of light beams having a different strength and irradiating only a respective one of said record regions;

repeatedly recording and erasing data in said record regions using another plurality of light beams irradiating only respective record regions, each of the light beams of said other plurality having a strength that is equal to the strength of the light beam used to crystallize the respective record region being irradiated by the light beam of the other plurality;

measuring second harmonics distortions of said record regions and determining based thereon one record region having uniform second harmonics distortions; and irradiating initializing light onto the recording layer through the reflection layer for initializing the disk, the initializing light having a strength that is equal to the strength of the light beams used to irradiate the one record region having uniform second harmonics distortion whereby to ensure that absorbing rates "Ai" of a given initialized crystal region and "Ae" of a given erased crystal region of said optical disk satisfy the following formula:

$$|Ai-Ae|/Ae<0.05.$$

7. A method for initializing an optical disk on which information is recorded, erased and reproduced by changing phase conditions of portions of said disk between crystal and non-crystal phase conditions, comprising the steps of:

providing a recording layer;

crystallizing a plurality of record regions of said recording layer with a corresponding plurality of light beams, each of said plurality of light beams having a different strength and irradiating only a respective one of said record regions;

repeatedly recording and erasing data in said record regions using another plurality of light beams irradiating only respective record regions, each of the light beams of said other plurality having a strength that is equal to the strength of the light beam used to crystallize the respective record region being irradiated by the light beam of the other plurality;

measuring second harmonics distortions of said record regions and determining based thereon one record region having uniform second harmonics distortions; and irradiating initializing light onto the recording layer for initializing the optical disk, the initializing light having a strength that is equal to the strength of the light beams used to irradiate the one record region having uniform second harmonics distortion whereby to ensure that length of a first recorded mark region "Li" of said optical disk and length "Le" of a mark after a second recording of said optical disk satisfy the following formula:

$$|Li-Le|<0.05 \ \mu m.$$

8. The method according to claim 7, wherein:
said "Li" and "Le" are equal to each other.

9. A method for initializing an optical disk in which information is recorded, erased and reproduced by changing phase conditions of portions of said disk between crystal and non-crystal phase conditions, comprising the steps of:

providing a recording layer on which said information may be recorded;

providing a reflection layer on the recording layer;

crystallizing a plurality of record regions of said recording layer with a corresponding plurality of light beams, each of said plurality of light beams having a different strength and irradiating only a respective one of said record regions;

repeatedly recording and erasing data in said record regions using another plurality of light beams irradiating only respective record regions, each of the light beams of said other plurality having a strength that is equal to the strength of the light beam used to crystallize the respective record region being irradiated by the light beam of the other plurality;

measuring second harmonics distortions of said record regions and determining based thereon one record region having uniform second harmonics distortions; and irradiating initializing light onto the recording layer through the reflection layer for initializing the disk, the initializing light having a strength that is equal to the strength of the light beams used to irradiate the one record region having uniform second harmonics distortions whereby to ensure that length of a first recorded mark region "Li" of said optical disk and length "Le" of a mark after a second recording of said optical disk satisfy the following formula:

$$|Li-Le| < 0.05 \; \mu m.$$

* * * * *